United States Patent
Sick et al.

(10) Patent No.: US 7,377,998 B2
(45) Date of Patent: May 27, 2008

(54) LIGHT-FAST OVERLAY PAPER

(75) Inventors: Stefan Sick, Baden-Baden (DE); Horst Blum, Gernsbach (DE); Robert Hansmann, Bühl (DE)

(73) Assignee: Papierfabrik Schoeller & Hoesch GmbH & Co. KG, Gernsbach (DE)

( * ) Notice: Subject to any disclaimer, the term of this patent is extended or adjusted under 35 U.S.C. 154(b) by 0 days.

(21) Appl. No.: 10/322,509

(22) Filed: Dec. 19, 2002

(65) Prior Publication Data

US 2003/0141027 A1    Jul. 31, 2003

(51) Int. Cl.
*D21H 21/26* (2006.01)
*D21H 21/38* (2006.01)
*B32B 29/00* (2006.01)

(52) U.S. Cl. .............. 162/160; 162/158; 162/164.1; 162/166; 428/503; 428/537.5

(58) Field of Classification Search ........ 162/135–137, 162/158, 160, 127, 162, 164.1, 165, 166; 428/535, 537.5, 478.8, 479.6, 486, 487, 500–503, 428/507, 511–514

See application file for complete search history.

(56) References Cited

U.S. PATENT DOCUMENTS

| | | | | |
|---|---|---|---|---|
| 2,384,369 | A * | 9/1945 | D Alelio | 528/248 |
| 2,713,055 | A * | 7/1955 | Baum et al. | 548/159 |
| 2,949,396 | A * | 8/1960 | Bonzagni | 162/167 |
| 3,616,021 | A | 10/1971 | Valerius | |
| 3,928,706 | A * | 12/1975 | Gibbons | 428/323 |
| 4,424,261 | A * | 1/1984 | Keeling et al. | 428/530 |
| 4,670,490 | A | 6/1987 | Yoshida et al. | |
| 4,943,637 | A * | 7/1990 | Seino et al. | 548/260 |
| 5,089,348 | A | 2/1992 | Louderback | |
| 5,178,915 | A * | 1/1993 | Moyle et al. | 427/318 |
| 5,545,476 | A * | 8/1996 | O'Dell et al. | 428/327 |
| 5,556,699 | A * | 9/1996 | Niira et al. | 428/323 |
| 5,629,365 | A * | 5/1997 | Razavi | 524/37 |
| 5,858,516 | A | 1/1999 | Ou-Yang | |
| 5,905,099 | A * | 5/1999 | Everaerts et al. | 522/126 |
| 6,159,331 | A * | 12/2000 | Chou | 156/331.3 |
| 6,248,342 | B1 * | 6/2001 | Trogolo et al. | 424/404 |
| 6,254,724 | B1 * | 7/2001 | Seltzer et al. | 162/70 |
| 6,267,844 | B1 * | 7/2001 | Jackson | 162/164.5 |
| 6,344,505 | B1 * | 2/2002 | Valentine et al. | 524/91 |
| 6,375,788 | B1 * | 4/2002 | Ma et al. | 156/307.4 |
| 6,379,814 | B1 * | 4/2002 | Dupre et al. | 428/528 |
| 6,436,159 | B1 * | 8/2002 | Safta et al. | 51/298 |
| 6,712,932 | B2 * | 3/2004 | Büchsel et al. | 162/135 |
| 6,841,236 | B2 * | 1/2005 | Pavelka et al. | 428/323 |
| 6,852,399 | B2 * | 2/2005 | Takahashi et al. | 428/213 |

FOREIGN PATENT DOCUMENTS

| | | |
|---|---|---|
| EP | 0 338 786 | 10/1989 |
| GB | 1 230 107 | 4/1971 |
| JP | 3 079 302 | 4/1991 |
| JP | 09-143874 | * 6/1997 |
| WO | WO 95/06568 | 3/1995 |

OTHER PUBLICATIONS

Glossary M-O, MeadWestvaco Packaging.*
European Search report in co-pending European Application EP 02 02 8521 dated Feb. 17, 2003.

* cited by examiner

*Primary Examiner*—Eric Hug
(74) *Attorney, Agent, or Firm*—RatnerPrestia

(57) ABSTRACT

An overlay paper is described which comprises a cellulosic non-woven to which a UV stabilizing agent is applied in an amount from 0.001 to 10% by weight, based on the grammage of the non-woven used, a process for producing the same and the use of the same for the production of a laminate.

8 Claims, No Drawings

LIGHT-FAST OVERLAY PAPER

The present invention relates in its general form to an overlay paper which is light-fast or contributes to light fastness, and to a process for producing such a paper.

FIELD OF THE INVENTION

Overlay papers in general are cellulosic papers which are filled or unfilled, that is to say can be finished with particles of great hardness in order to increase the abrasion resistance.

Overlay papers are normally used in laminated boards, such as are used, for example, in the furniture industry for kitchen and other worktops or restaurant counters, in laminate floors or in articles produced from polymer resins, such as ashtrays, cash trays, plastic cutlery or serving trays.

During the production of laminated boards and laminate floors, a strong film is usually produced from the overlay paper in a first step in an impregnation plant by means of polymer resin impregnation, preferably with a melamine formaldehyde resin, and subsequent drying. In a second step, this film is pressed against a decorative paper, which can likewise be impregnated, and as a rule against impregnated kraft papers and, in a further step, laminated to a fibre board, for example an MDF, HDF or plywood board.

Alternatively, in a single step, the overlay paper can be compressed against a decorative paper, kraft paper, a fibre board and a backing paper.

Furthermore, the overlay paper can itself serve as a decorative substrate in various applications if, before being impregnated with a polymer resin, it is itself printed.

Overlay papers generally have the following tasks:
1) Protecting the surface against abrasion and scratching and therefore protecting the decoration; and
2) Forming a closed surface by forming a strong composite with layers lying underneath and the polymer resin.

In order to carry out these tasks, an overlay paper therefore has to have the following properties:
a) Adequate wet strength (high wet breaking strength) during the impregnation and drying process;
b) High resin absorption and fast resin penetrability;
c) Homogeneous resin distribution in the x, y, z direction;
d) High dimensional stability;
e) Closely set pH in order to achieve optimum condensation conditions for the polymer resin;
f) Homogeneous distribution of the filler in the case of overlay papers filled with filler;
g) Good printability (adequate smoothness and adequate incorporation of fibres at the surface);
h) High transparency following the pressing of the film produced from the overlay paper, and
i) Adequate temperature stability, since the pressing process can take place at temperatures of more than 150° C.

From the relevant specialist area, it is generally known that, because of the large number of requirements on the overlay paper, both the selection of the raw materials for the overlay paper (that is to say pulps and additives) and the production process, such as with respect to freeness and drying, are subject to restrictions.

The addition of chemical additives has therefore been avoided, with the exception of wet strength agents, usually melamine formaldehyde resins, which were added to the fibrous stock in the production process.

Furthermore, in the relevant specialist area, the addition of further additives has also been dispensed with, since in such cases undesired interactions with the polymer resin cannot be ruled out (for example acceleration or retardation of the condensation process, changing the rheology of the resin in the pressing process and associated non-uniform transparency), and it was not possible to meet all of the requirements on the overlay paper.

This applies in particular with regard to light-fastness, which in the use of pulps and additives represents a significant property. For example, non light-fast additives can lead to yellowing of the overlay paper, of the film produced from the overlay paper and/or of the laminate ultimately produced.

Furthermore, it is known that in many cases the additives incorporated into the overlay paper may be washed out in the resin impregnation process and therefore be deposited in the resin bath and on metering rolls, which leads to soiling of the film surface and therefore necessitates undesired cleaning times.

OBJECT OF THE INVENTION

It was therefore the object of the present invention to overcome these disadvantages inherent in the prior art and to specify an overlay paper which is light-fast or contributes to light-fastness, and a process for producing the same.

SUBJECT OF THE INVENTION

According to the invention, a light-fast overlay paper according to Patent Claim 1 and a process for producing the same according to Patent Claim 6 are provided. Preferred embodiments of the overlay paper and of the process are specified in the respective subclaims.

The subject of the present invention is, moreover, the use of such an overlay paper for producing a UV-fast laminate.

The present invention is based on the surprising finding that an overlay paper to which specific UV stabilizers are applied meets all the aforementioned properties of an overlay paper and, furthermore, has excellent light-fastness.

DETAILED DESCRIPTION OF THE INVENTION

The overlay paper according to the invention normally comprises a cellulosic non-woven, to which a UV stabilizing agent is applied in an amount from 0.001 to 10% by weight, based on the grammage of the non-woven used.

The amount of UV stabilizing agent is expediently 0.01 to 3% by weight, based on the grammage of the non-woven used, preferably 0.05 to 1.0% by weight.

The UV stabilizing agent used in this case is normally selected from benzotriazoles, diphenylacrylates, cinnamates, sterically hindered amines and benzophenones. It is preferably benzotriazole compounds or benzophenone compounds, in a more preferred way hydroxybenzophenones and/or hydroxyphenylbenzotriazoles, in an even more preferred way 2-hydroxybenzophenones, 2,4-dihydroxybenzophenones, 2-phenylbenzotriazoles.

Further UV stabilizing agents preferred according to the invention are sterically hindered amines, for example those having a piperidin-1-yl framework or aminoxyamine framework.

These UV stabilizing agents are usually water-soluble or can be dispersed finely in water, exhibit adequate thermal stability (>150° C.) and are absorbed easily by the cellulosic non-wovens.

The UV stabilizing agents used according to the invention are, for example in a preferred embodiment, the product obtainable on the market under the description Evertex AF-20P.

The non-woven used according to the invention is usually a cellulosic non-woven, which usually comprises 1 to 99.9% by weight of bleached or unbleached cellulosic fibres. The cellulosic fibres can be softwood and/or hardwood cellulosic fibres.

The cellulosic non-woven can, moreover, contain 0.1 to 99% by weight of other fibrous additives, for example spun rayon and/or cotton fibres. The cotton fibres are preferably those which are alkali-washed.

In a preferred embodiment of the present invention, the non-woven used according to the invention consists of at least 30% by weight of chemical pulp, which preferably originates from softwood.

Non-wovens intended for use as the overlay paper may be produced on papermaking machines, normally with a grammage between 8 and 100 g/m$^2$, preferably between 12 and 60 g/m$^2$.

Furthermore, the overlay paper according to the invention can comprise the following constituents:

1. Wet strength agent, preferably melamine formaldehyde resin, usually in an amount from 0.1 to 20% by weight dry substance of wet strength agent, based on the fibre weight used, preferably 0.8 to 5% by weight dry substance, based on the fibre weight used.

2. Means improving the abrasiveness of the overlay paper, for example corundum particles, usually in an amount from 0.1 to 60% by weight, based on the fibre weight used, preferably 0.3 to 50% by weight, based on the fibre weight used. The corundum particles used are, for example, resin-encapsulated corundum particles, as described in DE 199 39 060 A1.

In the following text, the process according to the invention for the production of the overlay paper according to the invention will be described.

First of all, in a first step, a fibrous body is produced, usually by using a papermaking machine.

According to the invention, papermaking machines suitable in this case are Fourdrinier, inclined-wire or vat machines, preferably inclined-wire machines with through-drying.

The raw materials used are preferably unbeaten or beaten, bleached or unbleached chemical pulps from hardwood and/or softwood.

The raw materials, which normally comprise beaten natural fibres and, if appropriate, a proportion of other fibres, are used to produce a suspension with water. According to one embodiment of the present invention, this suspension can further comprise a suitable amount of particles improving the abrasiveness of the overlay paper to be produced.

The suspension produced above is then supplied from a storage container to the papermaking machine, usually via the flowbox (head box), as it is known. The said machine substantially has a circulating wire, which is led away over a number of dewatering chambers.

By means of suitable pipelines and pumping devices, the suspension is led to the wire over the dewatering chambers, the water being extracted by the chambers and the dewatering line. In the process, a fibrous layer forms on the moving wire.

This fibre layer is then removed from the wire and supplied to a drying system. This drying can be carried out in various ways, for example by means of contact drying or through-flow drying.

The application to the cellulosic non-woven is expediently carried out, according to the invention, following primary drying of the paper web via contact or through-flow drying, by means of the size press or alternatively via a spray beam, which, for example, applies the UV stabilizing agent directly to the papermaking machine wire before the drying system.

The application is normally carried out with an aqueous solution of the UV stabilizing agent which, according to the invention, comprises a 0.01 to 50% aqueous solution or suspension of the UV stabilizing agent, preferably a 0.1 to 5% aqueous solution or suspension of the UV stabilizing agent and, in particular, a 1 to 3% aqueous solution or suspension of the UV stabilizing agent.

The subject of the present invention is therefore also a process for producing the overlay paper according to the invention in which, by using a papermaking machine, the non-woven, after primary drying, has applied to it a UV stabilizing agent in an amount from 0.001 to 10% by weight, based on the grammage of the non-woven used.

Surprisingly, it has been established, according to the invention, that even after the impregnation of the overlay paper according to the invention in an aqueous resin solution, for example a melamine formaldehyde polymer solution, and residence in the latter during a time period of 3 s, for example, more than 60%, usually more than 80% and preferably more than 95% of the UV stabilizing agent remains in the overlay paper produced in accordance with the invention.

In this case, according to the invention, the determination of the amount of UV stabilizing agent retained by the non-woven was carried out as follows:

A non-woven to which a defined amount of UV stabilizing agent was applied according to the invention was impregnated for 3 s in a 50% aqueous melamine formaldehyde polymer resin solution and, after that, the loss of UV stabilizing agent was determined by determining the concentration of the UV stabilizing agent in the resin bath by means of UV/VIS spectroscopy. As a comparison, use was made of blind samples, in which a previously described 50% melamine formaldehyde polymer resin bath had defined amounts of UV stabilizing agent added to it.

Without wishing to be bound to any kind of theory, the inventors of the present invention assume at present that the UV stabilizing agents used according to the invention exhibit a pronounced affinity with the surface of the non-woven, and very high proportions penetrate through the cell walls into the interior of the cellulosic non-woven and therefore are not easily washed out by the polymer resin solution.

Furthermore, the overlay paper according to the invention has an excellent UV stability of 7 to 8 on the wool scale.

According to the invention, this was measured as follows: The overlay paper according to the invention was exposed to intensive radiation conditions (radiation power 1.1 W/m$^2$) over a time period of 168 hours. The comparison used was an overlay paper in which no UV stabilizing agent had been incorporated. The UV stability was then measured by using the light-fastness stages of the wool scale (DIN Standard 53388).

In this case, the irradiated sample surface was compared with the sample surface covered during the irradiation. In this case, the grey scale (grey scale to ISO 105A02), as it is known, was used as an interpretation aid, the light-fastness steps 7 and 8 corresponding to the contrast of the step 4 of the grey scale. The light-fastness step 6 corresponds to a clearly detectable contrast between irradiated and non-irradiated sample, analogous to step 3 of the grey scale.

Furthermore, in a preferred embodiment, the overlay paper according to the invention has a pH in the range from 5 to 7.5, preferably in the range from 5.5 to 6.5.

Furthermore, an overlay paper according to the invention preferably has the following properties:
a) Adequate wet strength (high wet breaking strength) during the impregnation and drying process;
b) High resin absorption and fast resin penetrability;
c) Homogeneous resin distribution in the x, y, z direction;
d) High dimensional stability;
e) Homogeneous distribution of the filler in the case of overlay papers filled with filler;
f) Good printability (adequate smoothness and adequate incorporation of fibres at the surface);
g) High transparency following the pressing of the film produced from the overlay paper, and
h) Adequate temperature stability, since the pressing process can take place at temperatures of more than 150° C.

The subject of the present invention is, moreover, the use of an overlay paper according to the invention for producing a laminate.

For this purpose, the overlay paper according to the invention is normally processed in a first step in an impregnation plant to form a strong film by means of polymer resin impregnation, preferably with a melamine formaldehyde resin, and subsequent drying. In a second step, this film can then be pressed against a decorative paper, which can likewise be impregnated, and as a rule against impregnated kraft papers and, in a further step, can be laminated to a fibre board, for example an MDF, HDF or plywood board.

Alternatively, in a single step, the overlay paper can be pressed against a decorative paper, kraft paper, a fibre board and a backing paper.

The overlay papers according to the invention are normally used in laminated boards, such as are used, for example, in the furniture industry for kitchen and other worktops or restaurant counters, in laminate floors or in objects produced from polymer resins, such as ashtrays, cash trays, plastic cutlery or serving trays.

Furthermore, the overlay paper according co the invention can itself serve as a decorative substrate in various applications if, before being impregnated with a polymer resin, it is itself printed.

In the following text, the present invention will be illustrated further by using an example. However, it goes without saying that the example in no way restricts the present invention as defined in the appended claims.

EXAMPLE

The UV absorber used comprises the UV stabilizing agent Evertex AF-20P (mixture of 20% phenol-2-(5-chloro-2H-benzotriazol-2-yl)-6-(1,1-dimethylethyl)-4-methyl-bumetriazole, 78% distilled water and 2% additives (surfactants)), obtainable on the market. This mixture was diluted with distilled/deionized water to form a 10% solution and, following the primary drying of the paper web, was applied via the size press at a temperature of 30-45° C.

The base papers used in a first sample were a mixture of 50% softwood pulp and 50% hardwood pulp and, in a second example, a mixture of 100% softwood pulp was selected.

In this case, an application of up to 3% by weight of the UV stabilizing agent was achieved, based on the grammage of the base paper.

In order to assess the properties of the overlay papers produced, the following parameters were determined:

Wet breaking strength[1]: in the longitudinal direction according to DIN/EN ISO 1924/2

Resin absorption[2]: for testing, use was made of a freshly made 50% aqueous solution of the melamine formaldehyde resin Madurit MW 450 (manufacturer: Solutia GmbH), which was stirred until completely clear at a temperature of max. 95° C. and then cooled down to 35° C. A piece of paper 100 cm$^2$ in size and cut with the cross cutter from one of the two samples of the overlay paper acted on according to the invention was weighed on an analytical balance and was placed on the resin surface of a crystallization dish filled with the resin solution until the perceptible strike-through of the resin. It was then removed and the excess resin on the surface of the paper was wiped off by means of a glass rod.

$$\text{Resin absorption} = \frac{\text{Final weight} - \text{paper weight}}{\text{Final weight}}$$

Resin penetration[3]: During the aforementioned resin absorption, the perceptible strike-through time was determined.

Transparency[4]: For this purpose, use was made of a 50% solution of the resin Madurit MW 490S (manufacturer: Solutia GmbH) with 1.0-1.2% Madurit MH 835 (manufacturer: Solutia GmbH), based on the resin solution. This resin solution was put into a trough and the overlay paper was impregnated in this trough until completely penetrated. Excess resin was then wiped off with a glass rod and the film produced was put into a laboratory press in the following layer sequence:

1 layer overlay film
1 layer decorative paper (impregnated)
MDF board
1 layer backing paper (impregnated)

Using a press platen temperature of 190° C. and a residence time of 30 s and a pressing pressure of 300 N/cm$^2$, this system was pressed to form a laminated board.

The transparency of the surface produced was assessed in comparison with a reference pattern and in analogy with the conditions in the NEMA (National Electric Manufacturer Association) Standards Publication LD 3-2000, pp. 9-10.

UV stability after irradiation[5]: The radiation source used was a xenon gas discharge lamp with a spectral bandwidth of 280-800 nm and a radiation power of 1.10±0.3 W/m$^2$. The test instrument (sample holder, discharge lamp and filter) conforms to ASTM G26 and also corresponds to the description in NEMA LD 3-2000.

The sample was preconditioned for about 48 h at 23° C.±2° C. and 50±5% relative atmospheric humidity.

Half of the sample was covered with a plate opaque to UV and, after the irradiation time period, the sample was conditioned again for 24 h under the aforementioned conditions. The optical assessment was carried out with a spacing from eye to sample body of 750-900 mm and at an angle of 45-75°, the sample body being rotated in the horizontal planar position in order to assess it from different angles.

Furthermore, a comparison was carried out between the laminate pressed onto black decorative paper and the wool colour scale which can be obtained on the market.

UV stability following natural incidence of light[6]: The sample was positioned at a 45° angle to the horizontal behind a window pointing in the south-east direction. The evaluation is carried out in a manner analogous to the aforementioned irradiation with a UV lamp.

Content of UV stabilizer[7]: The determination of the content of UV stabilizer was carried out by means of UV/VIS spectroscopy by using the resin bath used above for the measurement of the resin absorption and resin penetration, following the penetration of the two overlay paper samples produced in accordance with the invention, 1 g of the resin bath being dissolved in 100 ml N,N-dimethylformamide (DMF) and then the absorption of this solution being measured at a wavelength of 350 nm. In order to calibrate the measurements (in order to determine the absolute amount of UV stabilizer), use was made of a comparative measurement with an analogous resin bath to which a defined amount of UV stabilizer was added.

As a matching sample, moreover, the content (based on the grammage of the overlay paper produced) of UV stabilizer applied to the overlay paper according to the invention was determined after the production of the overlay paper and before introduction into the resin bath, a defined amount of the overlay paper being extracted with 100 ml DMF for 1 h and then, as above, the content of UV stabilizer in the DMF solution then being determined by means of UV/VIS spectroscopy.

and a melamine formaldehyde resin in an amount from 0.8 to 5% by weight dry substance of melamine formaldehyde resin, based on the fiber weight used, wherein said overlay paper is transparent.

2. Overlay paper according to claim 1, wherein the benzotriazole UV stabilizing agent is present in an amount from 0.01 to 3% by weight, based on the grammage of the non-woven.

3. Overlay paper according to claim 1, wherein the overlay paper has a grammage between 8 and 100 $g/m^2$.

4. Overlay paper according to claim 2, wherein the overlay paper has a grammage between 8 and 100 $g/m^2$.

5. Overlay paper according to one of claim 1, 2, 3, or 4, wherein the overlay paper is present in a laminate.

6. Process for producing an overlay paper comprising using a papermaking machine to provide a non-woven, and, following primary drying, applying to the non-woven a benzotriazole UV stabilizing agent comprising 2-phenylbenzotriazole in an amount from 0.001 to 10% by weight, based on the grammage of the non-woven, and a melamine formaldehyde resin in an amount from 0.8 to 5% by weight dry substance of melamine formaldehyde resin, based on the fiber weight used, wherein said overlay paper provided is transparent.

|  | 50% softwood pulp 50% hardwood pulp untreated | 50% softwood pulp 50% hardwood pulp UV stabilized (see above) | 100% softwood pulp untreated | 100% softwood pulp UV stabilized (see above) |
|---|---|---|---|---|
| Wet breaking strength[1] | 6.7 N/15 mm | 6.6 N/15 mm | 6.5 N/15 mm | 6.5 N/15 mm |
| Resin absorption[2] | 78.9% | 79.2% | 81.6% | 81.4% |
| Resin penetration[3] | 4 s | 4 s | 1 s | 1 s |
| Transparency[4] (following pressing) | No restriction | No restriction | No restriction | No restriction |
| UV stability following irradiation[5] 24 h wool-scale report | 7 Angle-dependent, detectable reduction in the colour intensity | 8 Unchanged | 7 Angle-dependent, detectable reduction in the colour intensity | 8 Unchanged |
| 168 h wool-scale report | 4 Angle-independent, detectable colour change | 7 Angle-dependent, detectable reduction in the colour intensity | 4-5 Angle-independent, detectable colour change | 7-8 Angle-dependent, detectable reduction in the colour intensity |
| 627 h wool-scale report | 3-4 Angle-dependent, detectable colour change | 6-7 Angle-dependent, detectable reduction in the colour intensity | 3 Angle-independent, detectable colour change | 6-7 Angle-dependent, detectable reduction in the colour intensity |
| UV stability following natural light irradiation[6] 168 h wool-scale report | 8 Unchanged | 8 Unchanged | 8 Unchanged | 8 Unchanged |
| 3320 h wool-scale report | 7 Angle-dependent, detectable reduction in the colour intensity | 8 Unchanged | 7 Angle-dependent, detectable reduction in the colour intensity | 8 Unchanged |
| Content of UV stabilizer[7] following resin penetration |  | 97.5% |  | 96.8% |

The invention claimed is:

1. Overlay paper comprising a cellulosic non-woven to which a benzotriazole UV stabilizing agent comprising 2-phenylbenzotriazole is applied in an amount from 0.001 to 10% by weight, based on the grammage of the non-woven, 7. Process according to claim 6, wherein the benzotriazole UV stabilizing agent is applied by means of a size press.

8. Process according to claim 6, wherein the benzotriazole UV stabilizing agent is applied via a spray beam.

* * * * *

UNITED STATES PATENT AND TRADEMARK OFFICE
CERTIFICATE OF CORRECTION

PATENT NO.       : 7,377,998 B2
APPLICATION NO.  : 10/322509
DATED            : May 27, 2008
INVENTOR(S)      : Sick et al.

It is certified that error appears in the above-identified patent and that said Letters Patent is hereby corrected as shown below:

On the Title Page, Insert Item --[30], Foreign Application Priority Data, December 21, 2001 (DE) 101 63 344.0--.

Signed and Sealed this

Nineteenth Day of August, 2008

JON W. DUDAS
*Director of the United States Patent and Trademark Office*